United States Patent [19]

Seitz

[11] Patent Number: 4,630,161
[45] Date of Patent: Dec. 16, 1986

[54] PROTECTION TECHNIQUE FOR EXPOSED CONDUCTOR

[75] Inventor: John R. Seitz, New London Township, Chester County, Pa.

[73] Assignee: American Antigravity Co., Inc., Great Neck, N.Y.

[21] Appl. No.: 656,431

[22] Filed: Oct. 1, 1984

[51] Int. Cl.[4] .......................................... H02H 3/00
[52] U.S. Cl. ...................................... 361/42; 361/60; 361/86; 361/87; 307/116; 307/140; 307/326
[58] Field of Search ....................... 361/42, 45, 60, 75, 361/86, 87, 88; 307/116, 140, 326, 327, 328

[56] References Cited

U.S. PATENT DOCUMENTS

| | | | |
|---|---|---|---|
| 3,781,608 | 12/1973 | Geiger | 361/100 |
| 3,784,842 | 1/1974 | Kremer | 361/86 X |
| 3,997,818 | 12/1976 | Bodkin | 361/42 X |
| 4,029,996 | 6/1977 | Miffitt | 307/326 |
| 4,175,255 | 11/1979 | Linnman et al. | 361/42 X |
| 4,507,568 | 3/1985 | Ziegler et al. | 307/326 X |

Primary Examiner—A. D. Pellinen
Assistant Examiner—Derek S. Jennings
Attorney, Agent, or Firm—Ostrolenk, Faber, Gerb & Soffen

[57] ABSTRACT

A technique is disclosed for protecting against electrocution or shock resulting from contacting an exposed conductor which is connected to a power supply. The flow of power to the conductor, whether DC or AC, is periodically interrupted and during the interruption, contact between a body and the conductor is sensed. If the body is not contacting the conductor, power is restored, but if the body is contacting, the interruption is maintained. The circuit may also distinguish between contact with the body and contact with an electrical device which receives power from the conductor. The electrical device includes a barrier circuit, such as a diode, which switches to an electrical state, such as a high impedance state, when power is interrupted. Because the electrical characteristics of the barrier circuit, such as its capacitance, differ from those of a body, the circuit is able to detect contact with a body.

12 Claims, 8 Drawing Figures

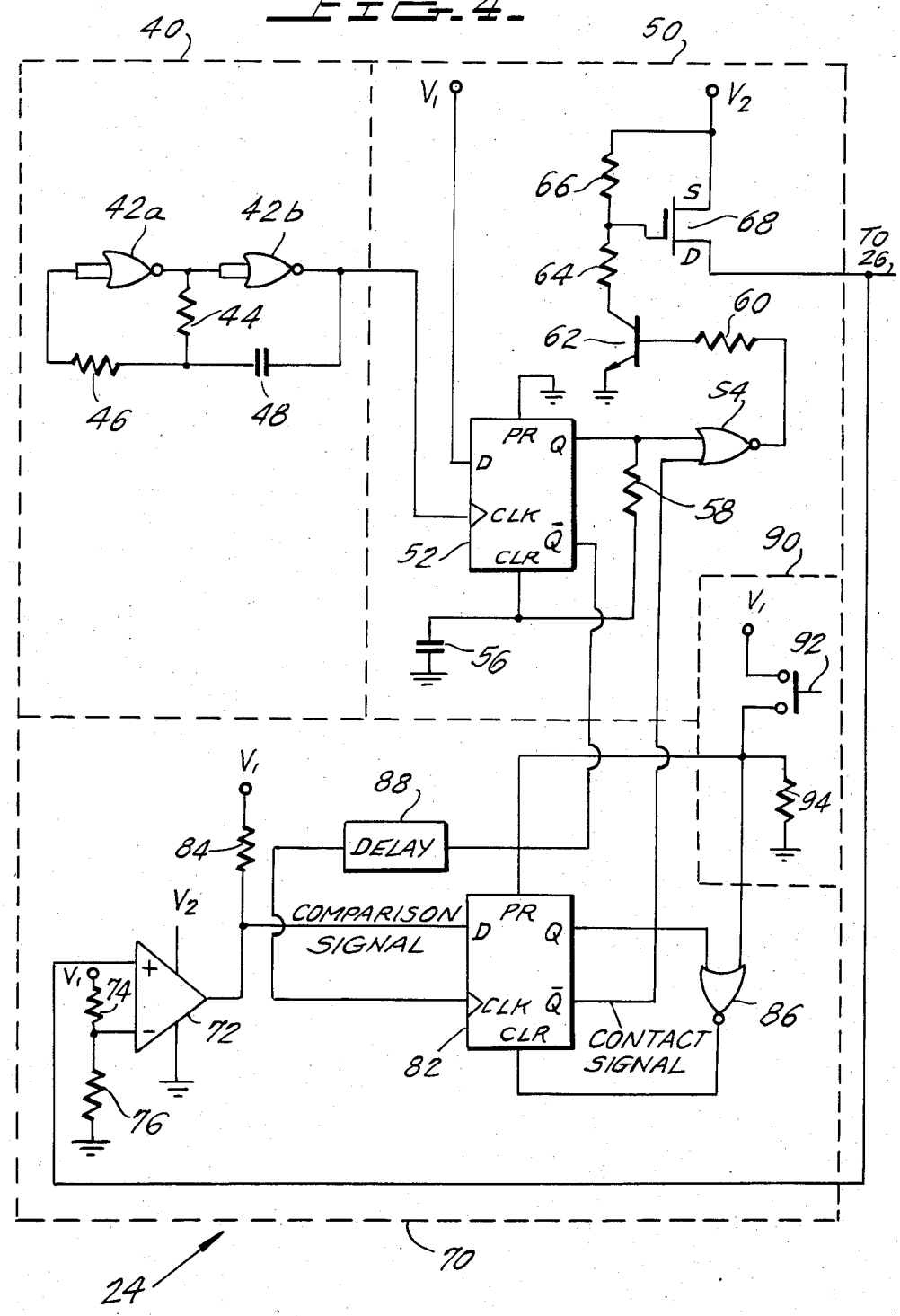

Q OUTPUT OF FLIP-FLOP 52 (FIG. 4)

D OUTPUT OF TRANSISTOR 68 (FIG. 4)

PROTECTION TECHNIQUE FOR EXPOSED CONDUCTOR

BACKGROUND OF THE INVENTION

1. Field of the Invention

The invention relates to a technique for protecting against electrocution or shock. More specifically, the invention relates to a circuit and method for terminating the supply of power to an exposed conductor when a part of a human body contacts the conductor.

2. Description of the Prior Art

A number of known circuits interrupt the supply of power to a normally-energized conductor when the conductor is contacted by a part of a human body. U.S. Pat. No. 3,997,818, issued to L. E. Bodkin, discloses a circuit for protecting against electrocution by switching off the supply of power whenever a body or other improper load permits current to flow in a direction opposite the normal current direction. The normal current direction is maintained by a rectifier such as a diode. By doubling the circuit, an alternating current may be used. When a current flow in the reverse direction is detected, a thyristor or silicon-controlled rectifier (SCR) is turned off, switching off the flow of power.

U.S. Pat. No. 3,781,608, issued to E. Geiger, discloses a similar circuit which detects a short circuit through the discharge of a capacitor. Upon detection of a short circuit, a thyristor is disabled, and a reduced current flows.

It would be advantageous to have a protection technique capable of interrupting power when a human body touches an exposed conductor in response to effects other than a flow of current due to the application of full power. The known prior art circuits all depend, to some extent, on a flow of current through the human body before power is interrupted, and it would be beneficial to provide a circuit in which such a flow of current is unnecessary.

In addition, it would be advantageous to provide such a technique which could be used with an exposed conductor which ordinarily provides power to a device in contact with it.

SUMMARY OF THE INVENTION

The invention provides a protection technique for detecting contact between a human body and an exposed conductor in response to effects other than a flow of current due to the application of full power through the human body. Upon detection of a human body, no further power is provided. The human body may be detected even though an electrical device is also contacting the conductor. As a result, the invention can be useful with an exposed power supply for a toy vehicle or other similar device.

The invention is based on the discovery that the power supply to an exposed conductor may be interrupted during extremely short intervals, such as a microsecond in length, and a test may be made while the power is interrupted to determine whether a human body is contacting the conductor. In addition, such tests may be made many times each second. While the power is off, contact with a body may be detected by testing capacitance or other effects not dependent on a flow of current through the body under full power. If a body is detected, the power is not switched on again, so that current need not flow through the body for detection. If no body is detected, the power will immediately be switched on, permitting further operation of a device contacting the conductor.

The invention is based on the further discovery that a barrier circuit may be provided in the toy or other electrical device contacting the conductor. This barrier circuit provides an electrical characteristic when the power is interrupted which permits the test to distinguish contact by a human body from contact by the device.

As used herein, the terms "contact" and "contacting" are intended to cover any approach between the contacting objects sufficient to have a detectable electrical effect. It is not necessary that the surfaces of the objects be engaged or deformed or that a person contacting the conductor be able to feel the contact.

The protection device of the invention includes a power control circuit which controls the flow of power from a power source to the conductor, and normally operates to periodically interrupt the flow of power momentarily. The protection device also includes a sensing circuit connected to the conductor for sensing whether an object is contacting the conductor during the interval in which the power is interrupted. If the sensing circuit detects an object, it provides a contact signal to the power control circuit, and the power control circuit responds by maintaining the interruption of the flow of power rather than restoring it. The device may also include reset circuitry, such as a push-button, for returning the power control circuit to normal operation by ending the contact signal, thus ending the interruption of the flow of power.

As described above, the conductor may be an exposed conductor for providing power to a device which is in contact with the exposed conductor. The contacting device may, for example, include a load connected to a barrier circuit. The barrier circuit may, for example, include a diode, which will switch from a low impedance state to a high impedance state when the power control circuitry interrupts the flow of power. In addition, the barrier circuit will have an electrical characteristic, such as capacitance or leakage current conductivity, that is substantially different than the equivalent electrical characteristic of the object being detected, such as a part of the human body. As a result, the sensing circuitry may detect the object by distinguishing between the electrical characteristic of the contacting device and the electrical characteristic of the body.

In order to detect the different electrical characteristic of the body, the sensing circuitry is connected to the conductor. The sensing circuitry may, for example, compare the voltage level of the conductor with a reference voltage level, and provide a comparison signal beginning when the two levels are equal. The timing of this comparison signal will indicate contact by a body with the conductor, because of the different electrical characteristics of the body. For example, the increased capacitance resulting from contact by a human body will cause the voltage to drop more slowly after the power control circuitry interrupts the power. As a result, the comparison signal will occur later than it would if the body were contacting the conductor. If the comparison signal is not received within a specified time, the sensing means may provide a contact signal indicating that a body has been sensed. The power control circuitry receives the contact signal and maintains the interruption of the flow of power rather than restoring it.

The method of the invention includes the steps of periodically interrupting a flow of power from a power source to the conductor; sensing whether an object is contacting the conductor after interrupting the flow of power; restoring the flow of power if the object is not sensed; and maintaining the interruption of the flow of power if the object is sensed.

The protection technique of the invention, as noted above, makes it possible to protect against shock or electrocution by detecting an effect other than current flow under full power through the body. In addition, the discovery that the test for contact with a body may be performed during a brief interruption makes it possible to perform many tests in a short interval of time. For example, each test may be approximately 1 microsecond in length and 500 such tests may be performed each second. As a result, a high level of protection is obtained.

Other objects, features and advantages of the invention will be apparent from the following description, together with the accompanying drawings and the appended claims.

BRIEF DESCRIPTION OF THE DRAWINGS

FIG. 4 is a schematic drawing of a protection circuit according to the invention.

DETAILED DESCRIPTION OF THE PREFERRED EMBODIMENTS

I. General Operation

Figure 1:
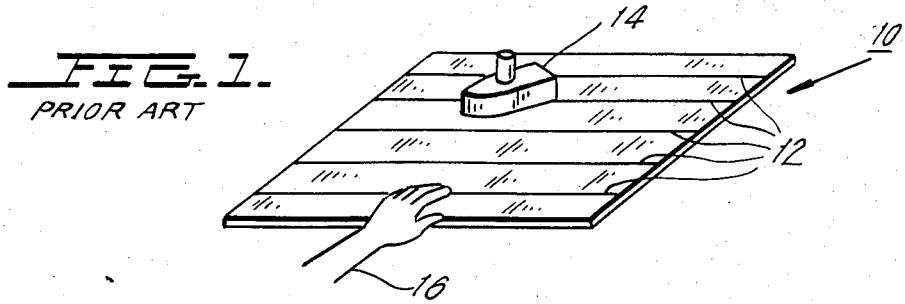
FIG. 1 is a view in perspective of a prior art device in which an exposed conductor provides power to a contacting device.

The invention operates to protect against accidental shock or electrocution in a device like that shown in FIG. 1. The general operation of the invention may be understood from FIG. 2.

FIG. 1 shows a prior art device in which exposed conductor 10 is divided into a series of conductive strips 12 of alternating polarity. Vehicle 14, shown as a boat, makes contact with conductor 10 in such a way that current may be conducted through a motor in vehicle 14, causing it to move about the surface of conductor 10. The arrangement of contacts on vehicle 14 is such that current is conducted through the motor in all positions of vehicle 14 on conductor 10. In addition, many other arrangements are known in which an exposed conductor, shaped as a surface, rail or track, provides power through contacts to an electrical device of some sort.

As shown in FIG. 1, it is possible for a part of a human body, such as hand 16, to come in contact with conductor 10 in such a way as to receive an electrical current. This may happen accidentally or because a person does not realize that the conductor 10 is energized. In addition, if the device is a toy for children, contact with conductor 10 may result from the user's failure to understand the risk of shock or electrocution.

Figure 2:
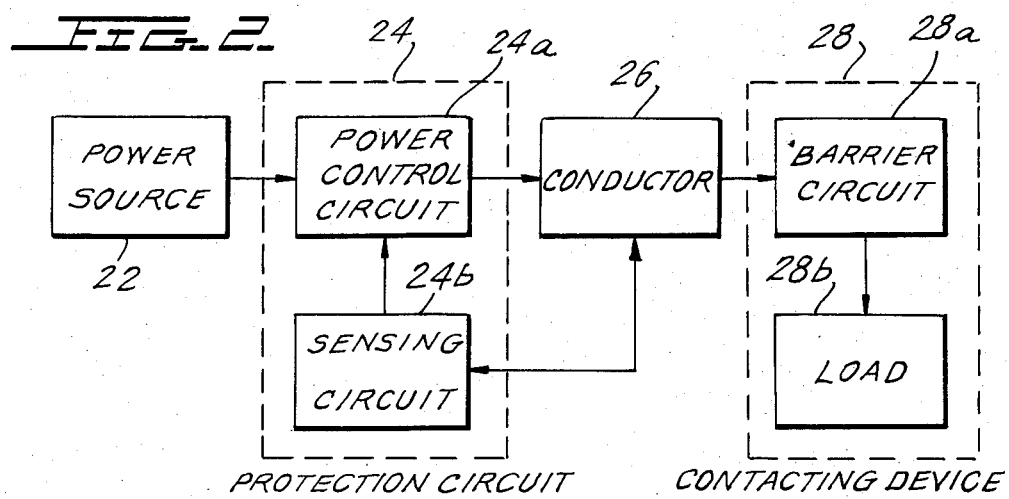
FIG. 2 is a block diagram showing the major functional components of the invention.

The risk of shock or electrocution presented by an exposed conductor may be avoided by the circuit of the invention, shown in FIG. 2. As illustrated, power from power source 22 is provided to conductor 26 through protection circuit 24. The power may be either direct current (DC) or alternating circuit (AC), and the term "power" is used herein to cover both DC and AC power. Specifically, power control circuit 24a within protection circuit 24 normally operates to permit power to flow to conductor 26 but periodically interrupts the flow of power. During the interruption, sensing circuit 24b monitors conductor 26 to sense whether an object such as a part of a human body is contacting conductor 26. Sensing circuit 24b may passively monitor an electrical characteristic such as capacitance or may actively monitor by supplying a signal such as a medium or high frequency signal of low amplitude, and measuring changes in the signal. If sensing circuit 24b detects no object, power control circuit 24a continues with normal operation, restoring the flow of power after the interruption. If, on the other hand, sensing circuit 24b detects an object contacting conductor 26, it provides a contact signal to power control circuit 24a. Power control circuit 24a then maintains the interruption of the flow of power, protecting against the risk that current will be conducted through the part of the body from conductor 26.

As discussed in relation to FIG. 1, above the invention may be used in an arrangement including a device contacting the conductor 26. FIG. 2 also shows contacting device 28 for receiving power from conductor 26. Contacting device 28 includes barrier circuit 28a, a circuit which ordinarily permits power to flow freely to load 28b. When the flow of power is interrupted by power control circuit 24a, however, barrier circuit 28a changes to a different electrical state, such as a high impedance state, in which sensing circuit 24b is able to detect contact with an object such as a part of a body even though contacting device 28 remains in contact with conductor 26. In effect, sensing circuit 24b is able to distinguish between contact with barrier circuit 28a and contact with a part of a body.

Figure 3A:
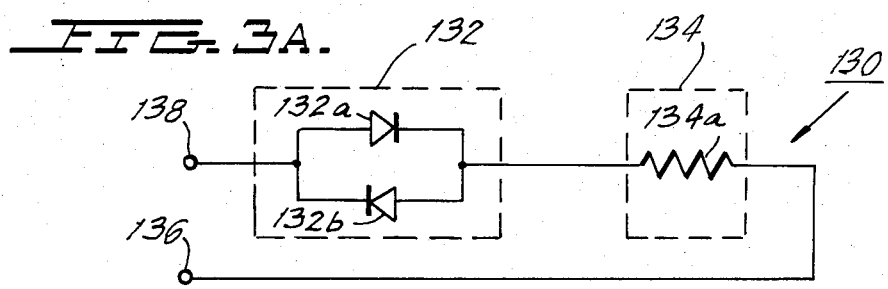
FIG. 3A is a schematic drawing of an alternative embodiment of the electrical circuitry in a contacting device according to the invention.
Figure 3:
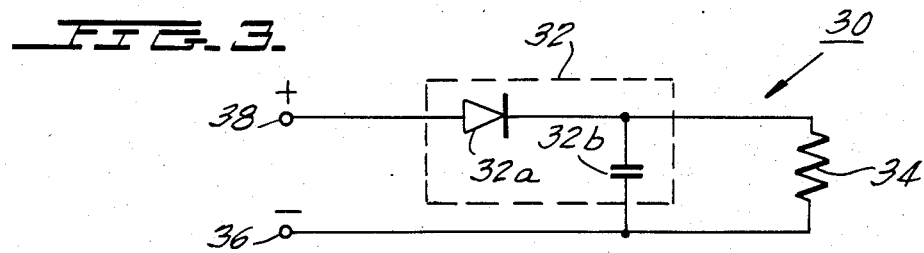
FIG. 3 is a schematic drawing of the electrical circuitry in a contacting device according to the invention.
Figure 5A:
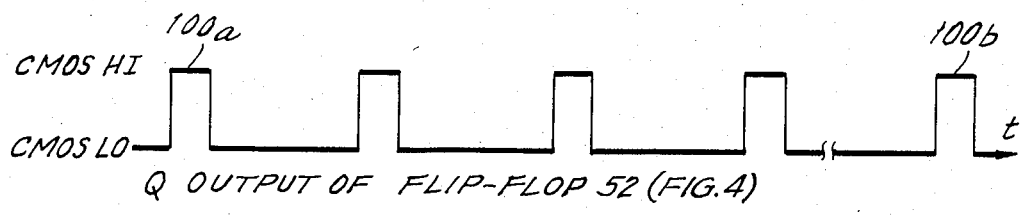
FIG. 5A is a timing diagram showing an output from one of the flip-flops in the protection circuit of FIG. 4.
Figure 5B:
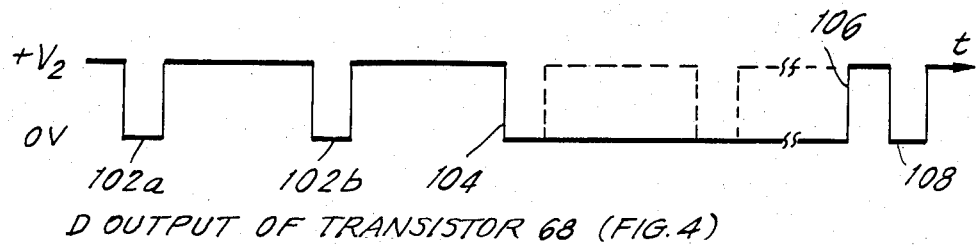
FIG. 5B is a timing diagram showing the flow of power to the load under the control of the protection circuit of FIG. 4.
Figure 6:
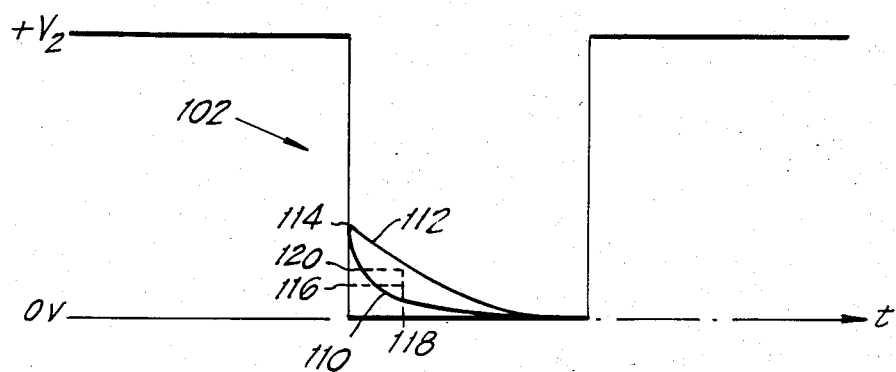
FIG. 6 is a detailed illustration of the features of each power interruption in FIG. 5B, showing how the sensing circuitry of the invention may distinguish whether an object is contacting the conductor.

The components shown in FIG. 2 provide a protection device for electrical apparatus according to the invention and also operate to perform the method of the invention. FIGS. 3 and 4 show in greater detail the electrical circuitry of the invention and FIGS. 5A, 5B and 6 show in greater detail the wave forms resulting from operation of the invention.

II. Electrical Circuitry

Many types of electrical circuits could be provided for performing the functions of interrupting the flow of power to the exposed conductor and sensing whether an object is in proximity to the conductor. FIGS. 3 and 3A show specific electrical circuits which may be used in the contacting device 28 which receives power from conductor 26. FIG. 4 shows a specific example of a protection circuit 24 which may be used in the invention.

Although sensing circuit 24b could be designed to sense the difference between the state of conductor 26 with no object contacting it and its state when contacted by a part of the human body, sensing circuit 24b must also distinguish between contact with a human body and contact with contacting device 28. For this purpose, circuit 30, as shown in FIG. 3, provides electrical characteristics for contacting device 28 which are distinguishable from the electrical characteristics of a part of the human body. Circuit 30 includes barrier circuit 32 connected to load 34. Typically, load 34 will be a motor which receives power through nodes 36 and 38. Nodes 36 and 38 may be contacts which rest directly on conductor 26, or they may be the output of a circuit which receives power from two or more contacts and provides that power to nodes 36 and 38. Barrier circuit 32 includes capacitor 32b connected in parallel across load 34 and diode 32a connected in series with the parallel circuit. As a result, when a voltage is applied across nodes 36 and 38, diode 32a will become conductive, so that load 34 will draw power and capacitor 32b will charge to the applied voltage less the voltage drop across diode 32a. Then, when the applied voltage is interrupted, diode 32a will immediately be reverse biased and will be non-conductive, because of the voltage on capacitor 32b, so that the current through diode 32a will be interrupted. Capacitor 32b will then discharge through load 34, supplying power to the load while maintaining the proper voltage level across the load during the brief interruption. The electrical characteristics of circuit 30, as seen across nodes 36 and 38, will be those of the high impedance state of diode 32a.

As noted above, the electrical characteristics of circuit 30 must be such that sensing circuit 24b may distinguish between the presence of a human body and the presence of contacting device 28. For that purpose, diode 32a may be a low capacitance diode, of approximately 5–50 picofarads in its high impedance state. In contrast, a part of the human body will typically have a capacitance of about 200 picofarads, so that a part of the human body may be readily distinguished from contacting device 28. In addition, diode 32a must be capable of withstanding a reverse voltage nearly as great as the voltage applied, at least for a brief time.

FIG. 3A shows alternative circuit 130 which may be used to provide electrical characteristics for contacting device 28 where an alternating current (AC) is applied across nodes 136 and 138. Barrier circuit 132 includes two anti-parallel diodes 132a and 132b. When power is applied in either direction across nodes 136 and 138 at a level greater than the barrier voltage of diodes 132a and 132b, one of the diodes will be in a low impedance state and will permit current to flow freely through load 134. Therefore, circuit 130 can be used where an AC current is applied across nodes 136 and 138. If the voltage across nodes 136 and 138 falls below the barrier voltage and remains low, however, diodes 132a and 132b will both be in a relatively non-conductive high impedance state. Under these conditions, the current through load 134 is immediately interrupted when power control circuit 24a interrupts the flow of power to conductor 26.

Circuits 30 and 130 use diodes 32a, 132a and 132b as voltage sensitive devices which allow a useful current to be drawn above a certain voltage, called the barrier voltage, but which prevent current flow below the barrier voltage. Diodes 32a, 132a and 132b may thus be ordinary diodes. Instead of a diode, however, a transistor switching circuit or other appropriate switching circuit could be used.

FIG. 4 shows a protection circuit 24 which may be used in a DC embodiment of the invention. Oscillator 40 provides a signal at a fixed frequency to switching circuit 50, and oscillator 40 and switching circuit 50 together peform the basic function of power control circuit 24a. Detection circuit 70 is connected to conductor 26 and performs the basic function of sensing circut 24b. Detecting circuit 70 also provides a contact signal indicating an object contacting conductor 26, causing the flow of power to remain interrupted. After such an interruption, reset circuit 90 may be used to end the interruption of the flow of power automatically or in response to an input from an operator.

Oscillator 40 is constructed around NOR gates 42a and 42b. These gates, together with other NOR gates discussed below, may be parts of a standard 4001 integrated circuit (IC). In order to provide the desired frequency of oscillation, resistors 44 and 46 and capacitor 48 may be provided with appropriate values. For example, resistor 44 may be 33K ohms, resistor 46 may be 1 megohm, and capacitor 48 may be 0.1 microfarads.

The oscillating output from oscillator 40 functions as a clock for D-type flip-flop 52 in switching circuit 50. The D input to flip-flop 52 is connected to a stable voltage $V_1$, which is a high voltage representing a logical "one". The preset (PR) input is connected to ground. The Q output of flip-flop 52 is connected through NOR gate 54, which will normally function as an inverter, changing the sign of a series of pulses from flip-flop 52, as discussed in relation to FIGS. 5A and 5B, below. The pulses from NOR gate 54 are then provided through resistor 60 to an arrangement of transistors for controlling the actual flow of power from the power source. The power received from the power source is at voltage $V_2$, which may be +28 volts. Switching transistor 62 operates through resistor 64 to maintain power transistor 68 in a conductive condition. When the signal from NOR gate 54 goes low, however, switching transistor 62 is rendered non-conductive, and acts with resistor 66 to turn off power transistor 68, interrupting the flow of power to conductor 26.

Many other arrangements could be used to provide the switching function. In the embodiment shown in FIG. 4, however, resistor 60 may be 10K ohms and resistors 64 and 66 may each be 4.7K ohms. Switching transistor 62 may be a standard 2N3904 NPN transistor, while power transistor 68 may be a standard IRF-9531 P-channel power MOSFET. Power levels $V_1$ may be provided by a standard 7815 IC, providing 15 volts, for example. In general, $V_1$ could be any voltage from 5–15 volts representing a logical "one". Power level $V_2$ is supplied by an external power supply.

The Q output from flip-flop 52 is also conducted through resistor 58 to the clear (CLR) terminal of flip-flop 52. In addition, the CLR terminal is grounded through capacitor 56. This arrangement causes flip-flop 52 to be reset a short time after it is set by a pulse from oscillator 40. Thus flip-flop 52 is functioning as a monostable multivibrator. The resulting wave form will be discussed in relation to FIG. 5A below. Resistor 58 may be 33K ohms and capacitor 56 may be 100 picofarads.

Detection circuit 70 is centered around comparator 72, which functions to compare the voltage level received from conductor 26 with a reference voltage level. The reference voltage level is proportioned from voltage $V_1$ by resistors 74 and 76. When the flow of power to conductor 26 is interrupted, the voltage at the "+" terminal of comparator 72 will drop, and when it crosses the reference voltage, comparator 72 will begin to provide a comparison signal to D-type flip-flop 82, which tests the timing of the comparison signal, as described below.

The D-type flip-flop 82 may, for example, be part of the same 4013 IC as D-type flip-flop 52. Comparator 72 may be a standard LM311 device, which will ordinarily pull its output to a low level. Resistor 74 may be 22K ohms and resistor 76 may be 1K ohm. In order to pull the signal received by the D input of flip-flop 82 to a high level, when comparator 72 detects equality, voltage $V_1$ is connected through resistor 84, which may be 33K ohms. Comparator 72 will permit its output to rise when it begins to provide the comparison signal. When the flow of power to conductor 26 resumes, and the voltage level again crosses the reference voltage level, comparator 72 will stop providing the comparison signal. It will then pull its output down again.

To test the timing of the comparison signal, flip-flop 82 is clocked by the $\overline{Q}$ output of flip-flop 52, which may be appropriately timed by delay 88. In other words, whenever flip-flop 52 is reset, flip-flop 82 will be clocked so that the output from comparator 72 will be stored. If the voltage level from conductor 26 has dropped below the reference voltage, comparator 72 will permit the D input to flip-flop 82 to be drawn up, beginning the comparison signal. If this occurs before flip-flop 82 is clocked, the subsequent clocking of flip-flop 82 will cause it to store a high value, so that the $\overline{Q}$ output will remain low. When, however, the comparison signal does not go high until after flip-flop 82 is clocked, the $\overline{Q}$ output goes high. This causes NOR gate 54 to have a low output regardless of the Q output from flip-flop 52. As a result, the interruption of power is maintained regardless of the sequence of pulses from flip-flop 52.

Reset circuit 90 includes push-button switch 92 or other appropriate switch for connecting to voltage $V_1$, which represents a logical "one". Ordinarily, the PR input to flip-flop 82 will be grounded through resistor 94, which may be 33K ohms. When switch 92 is closed, however, the PR input to flip-flop 82 will go high, causing the contact signal to return to a low value. This permits the normal operation of the switching circuit 50 to resume, and power will be restored to conductor 26. The input from reset circuit 90 is also connected to NOR gate 86, which ensures that flip-flop 82 will be prevented from being cleared after it is preset by the signal from reset circuit 90. During those periods in which the contact signal is low, indicating that no object has been detected, the Q output of flip-flop 82 remains high, which also operates through NOR gate 86 to prevent the clearing or resetting of flip-flop 82. As a result of this arrangement, flip-flop 82 will be stable in either state.

Rather than being manually reset, as by push-button switch 92, protection circuit 24 may be automatically reset after an interruption has continued for some predetermined period. For example, a counter could be connected to begin receiving the output of oscillator 40 at the beginning of the contact signal, with its overflow connected to the PR input of flip-flop 82. As a result, power would be restored after a time period determined by the size of the counter, which would provide a resetting input signal at its overflow value. Although this would result in a brief pulse of current through an object stll in contact with conductor 26, that pulse would not carry sufficient power to harm a body. It is known that pulses of less than one second duration at ordinary current levels may be perceptible but are generally not sufficient to cause involuntary muscle contraction. Each pulse in the protection circuit 24 of FIG. 4 will typically be much shorter than 1 second, and only one pulse would be necessary to test for the contacting object after a period of interruption. Such a pulse would not have a harmful effect.

As discussed below in relation to FIG. 6, the electrical circuit of FIG. 4 is capable of detecting a difference in the rate at which the voltage on conductor 26 drops when the flow of power is interrupted. Therefore, protection circuit 24, as shown in FIG. 4, will be useful for detecting a difference in capacitance. Many other similar circuits could be provided for the same purpose, however, and other parameters could also be used to detect an object contacting the exposed conductor, such as leakage current out of or into the conductor 26 or the effect of a body on a small medium or high frequency signal applied to conductor 26 during the interruption of power. In addition, circuit 24 could be readily modified or another circuit could be provided for use with an AC current.

From the above discussion of protection circuit 24, it is now possible to consider in greater detail the operation of the invention.

III. Detailed Operation

The detailed operation of the invention is illustrated in FIGS. 5A, 5B and 6. Each of these figures is a timing diagram showing pulse characteristics within the electrical circuitry of FIG. 4.

FIG. 5A illustrates the pulse sequence from the Q output of flip-flop 52. The basic features of this sequence are that a series of reltively narrow, rectanguler pulses are separated by relatively long periods of a low signal. The length of each of the pulses is exaggerated in FIG. 5A, so that each pulse is actually much shorter in relation to the time between pulses than shown. As discussed above, each pulse may be approximately 1 microsecond in length, and there may be as many as 500 pulses per second.

FIG. 5B, on the other hand, shows the voltage level on conductor 26. As shown, this wave form consists of relatively long periods of constant voltage $V_2$. This voltage is periodically interrupted briefly by a pulse such as pulses 102a and 102b, each of which has the same length as each pulse 100a in FIG. 5A. As discussed above, when no contact signal is received, NOR gate 54 simply inverts the Q output of flip-flop 52 and the voltage to conductor 26 corresponds to the inverted signal from NOR gate 54. After falling edge 104, however, an object is detected by detection circuit 70. As a result, the contact signal goes high, and NOR gate 54 is locked with a low output. As shown in FIG. 5B, the brief interruption which would ordinarily occur after falling edge or trailing edge 104 is maintained, and the power flow to conductor 26 is not resumed. Subsequently, if reset circuit 90 receives an input signal, the interruption will be ended by rising edge 106, as shown in FIG. 5B. Shortly thereafter, another pulse 100b will occur at the Q output of flip-flop 52 and the flow of power will again be interrupted, as shown by pulse 108. If no object is detected, pulse 108 will end, and normal operation will continue.

FIG. 6 shows in detail the characteristics of pulse 102, which represents one of the pulses in the voltage on conductor 26. Pulse 102 immediately drops the voltage to barrier voltage 114, which is the voltage at which barrier circuit 28a enters its high impedence state. Assuming the use of circuit 30 from FIG. 3, diode 32a will then begin to act as a capacitor, discharging along curve 100 if no body is contacting conductor 26. Reference voltage 116, which is less than barrier voltage 114 but greater than curve 110 at time 118, will be compared with the voltage on conductor 26 by detection circuit 70, which will then provide a comparison signal. This will occur before flip-flop 82 is clocked at time 118, so that the contact signal will remain low. If, on the other hand, a body is contacting conductor 26, changing the capacitance substantially the voltage will have dropped to a voltage 120 along curve 112 at time 118. Because voltage 120 is greater than reference voltage 116, this decay will not reach the reference voltage 116 until substantially after time 118, so that when flip-flop 82 is clocked, detection circuit 70 will not yet have provided a comparison signal. As a result, the contact signal will go high, maintaining the interruption, and the body will be protected from shock or electrocution.

IV. Miscellaneous

As discussed above, the electrical circuitry shown in FIG. 4 is appropriate for distinguishing between the capacitance of a part of a body and that of the contacting device 28. If, on the other hand, the leakage current were being used to distinguish, diodes 32a, 132a and 132b should be low leakage diodes, so that all leakage would be through the part of the body rather than through the diodes. In this case, an electrical circuit designed to detect variations in the leakage current during the interruption of the flow of power would be used.

Although the present invention has been described in connection with a plurality of preferred embodiments thereof many other variations and modifications will now become apparent to those skilled in the art. It is preferred, therefore, that the present invention be limited not by the specific disclosure herein, but only by the appended claims.

What is claimed is:

1. A protection device comprising:
power control means for controlling a flow of power from a power source to a conductor, the power control means being normally operable for periodically interrupting the flow of power; and
sensing means connected to the conductor for sensing whether an object is contacting the conductor while the flow of power is interrupted and for providing a contact signal to the power control means when the object is sensed; the power control means being further operable for restoring the flow of power after a momentary interruption if the contact signal is not provided by the sensing means and for maintaining the interruption of the flow of power if the contact signal is provided for protecting against the conduction of power to the object.

2. The device of claim 1 further comprising reset means for providing an input signal to the sensing means for ending the contact signal and for ending the interruption of the flow of power.

3. The device of claim 1 in which the sensing means is connected for receiving the level of power from the conductor, the sensing means comprising reference means for providing a reference level, comparison means connected for receiving the reference level and for receiving the level of power from the conductor for providing a comparison signal when the level of the power from the conductor equals the reference level, and testing means for testing the time of occurrence of the comparison signal for determining whether the time of occurrence indicates that the object is contacting the conductor, the testing means providing the contact signal when the time of occurrence of the comparison signal indicates that the object is contacting the conductor.

4. An electrical apparatus comprising:
an exposed conductor; contact means for contacting the exposed conductor for receiving power therefrom;
a protection device, connected with the conductor for protecting against the conduction of power from the exposed conductor of an object contacting the conductor; the protection device comprising:
power control means for controlling a flow of power from a power source to the conductor, the power control means being normally operable for periodically interrupting the flow of power; and
sensing means connected to the conductor for sensing whether the object is contacting the conductor while the flow of power is interrupted and for providing a contact signal to the power control means when the object is sensed; the power control means being further operable for restoring the flow of power after a momentary interruption if the contact signal is not provided by the sensing means and for maintaining the interruption of the flow of power if the contact signal is provided for protecting against the conduction of power to the object.

5. The apparatus of claim 4, in which the contact means comprises a load and a barrier circuit having first and second electrical states and being connected to the load, the barrier circuit being in the first electrical state during the flow of power and the second electrical state when the flow of power is interrupted.

6. The apparatus of claim 5 in which the barrier circuit comprises a diode, the first electrical state being a low impedance state and the second electrical state being a high impedance state.

7. The apparatus of claim 5 in which the barrier circuit has a load electrical characteristic in the second electrical state, the object having an object electrical characteristic different from the load electrical characteristic, the sensing means comprising means for distinguishing between the load electrical characteristic and the object electrical characteristic.

8. The apparatus of claim 7 in which the load and object electrical characteristics are capacitances.

9. A method of protecting against conduction of power from a conductor to an object, comprising:
periodically interrupting a flow of power from a power source to a conductor;
sensing whether an object is contacting the conductor after interrupting the flow of power;
restoring the flow of power to the conductor after a momentary interruption if the object is not sensed contacting the conductor; and
maintaining the interruption of the flow of power to the conductor if the object is sensed contacting the conductor.

10. The method of claim 9 further comprising providing an input signal for ending the interruption of the flow of power maintained after the object is sensed.

11. The method of claim 9 further comprising changing an electrical characteristic of a device contacting the conductor after the interrupting step, the sensing step comprising distinguishing between the electrical characteristic of the device and an electrical characteristic of the object.

12. The method of claim 11 in which the changing step comprises increasing the impedance of the device contacting the conductor.

* * * * *